Figure 1:
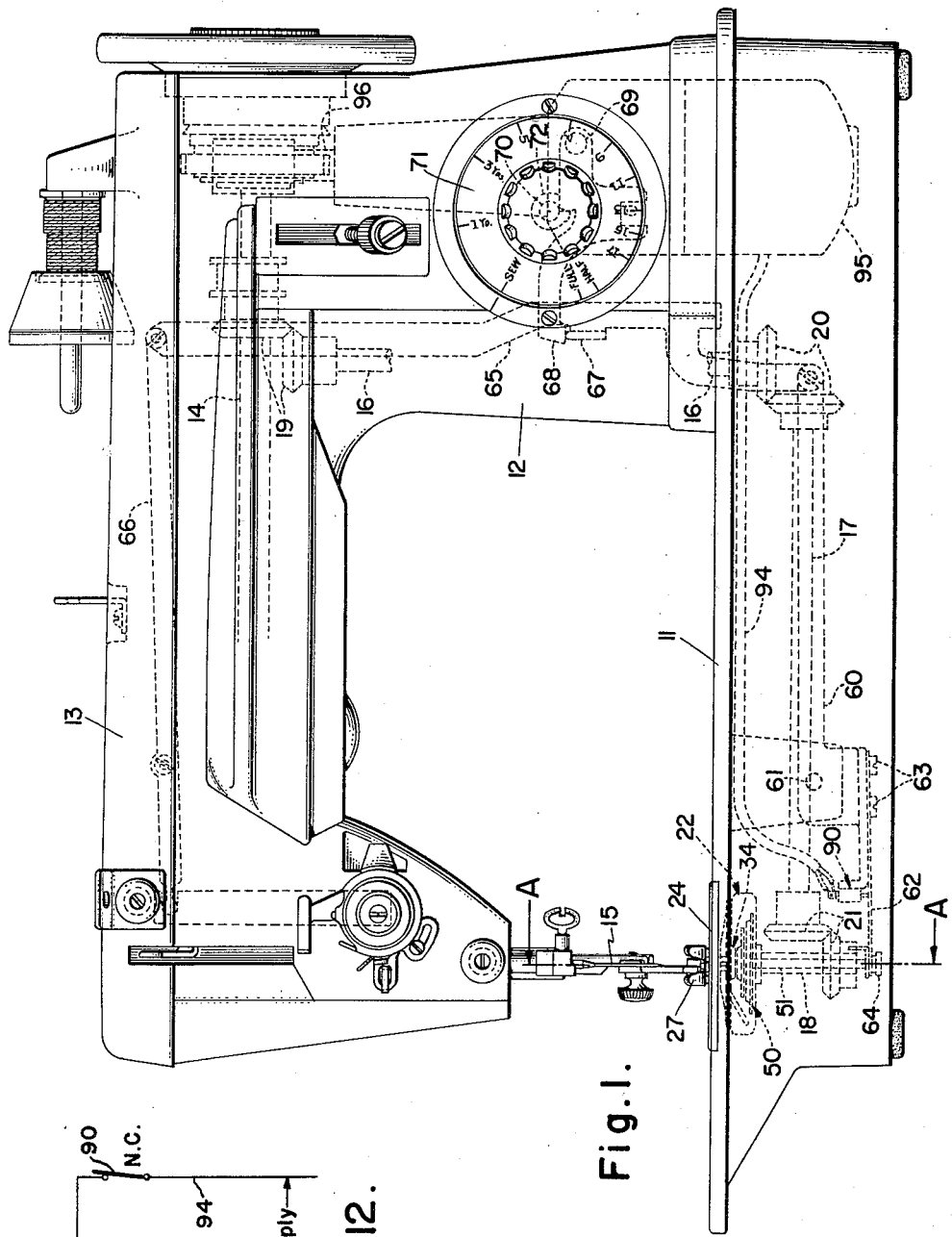

June 23, 1964

S. J. KETTERER 3,138,127

CONTROL DEVICE FOR THE DRIVE OF A LOCK STITCH SEWING MACHINE

Filed Nov. 3, 1961

5 Sheets-Sheet 1

INVENTOR.
STANLEY J. KETTERER
BY
Marshall J. Breen
ATTORNEY

WITNESS
Nicholas Leszczak

June 23, 1964    S. J. KETTERER    3,138,127
CONTROL DEVICE FOR THE DRIVE OF A LOCK STITCH SEWING MACHINE
Filed Nov. 3, 1961    5 Sheets-Sheet 2
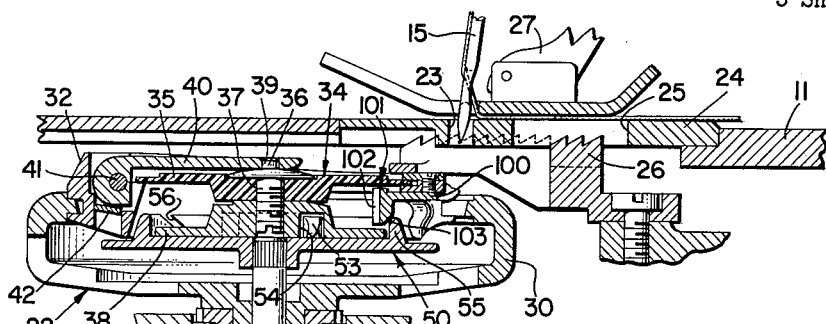
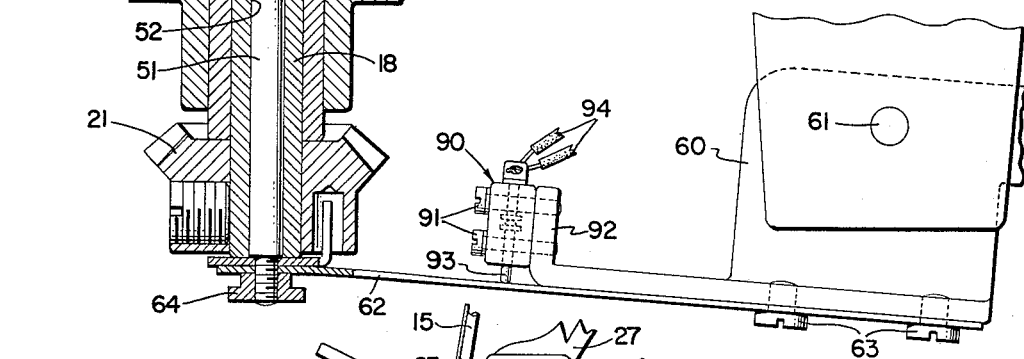
Fig. 2.
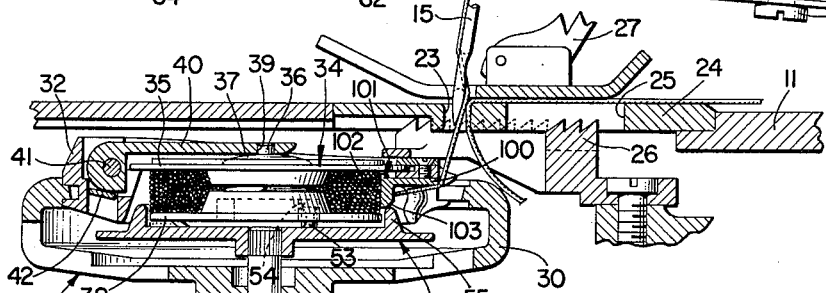
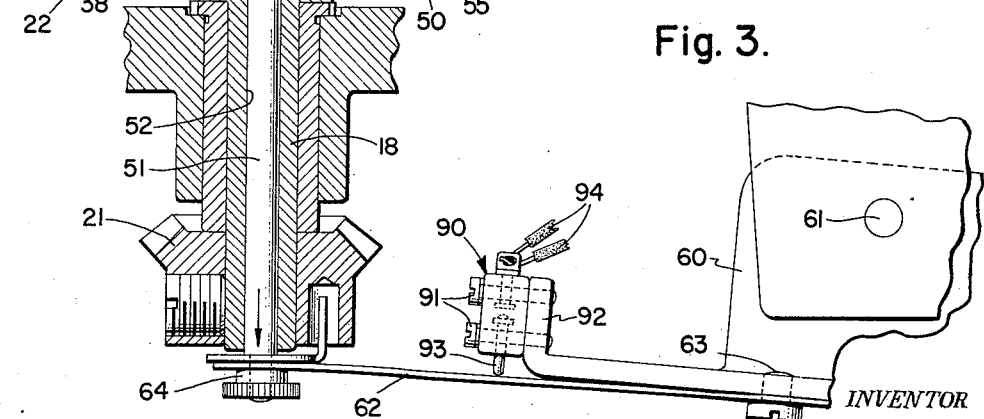
Fig. 3.
WITNESS
Nicholas Leszczak
INVENTOR
STANLEY J. KETTERER
BY Marshall J. Breen
ATTORNEY June 23, 1964 S. J. KETTERER 3,138,127
CONTROL DEVICE FOR THE DRIVE OF A LOCK STITCH SEWING MACHINE
Filed Nov. 3, 1961 5 Sheets-Sheet 3
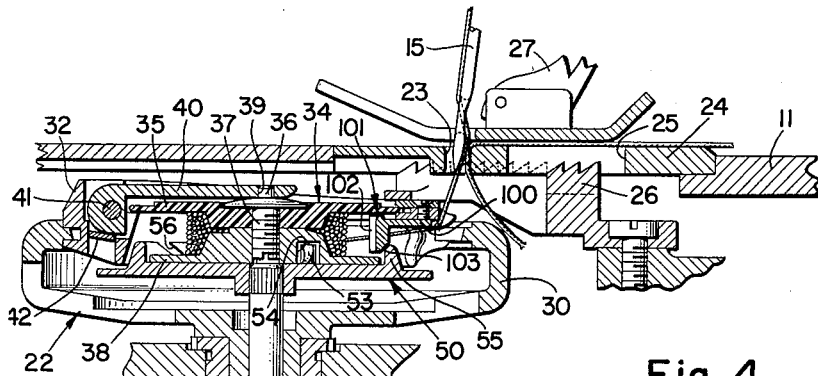
Fig. 4.
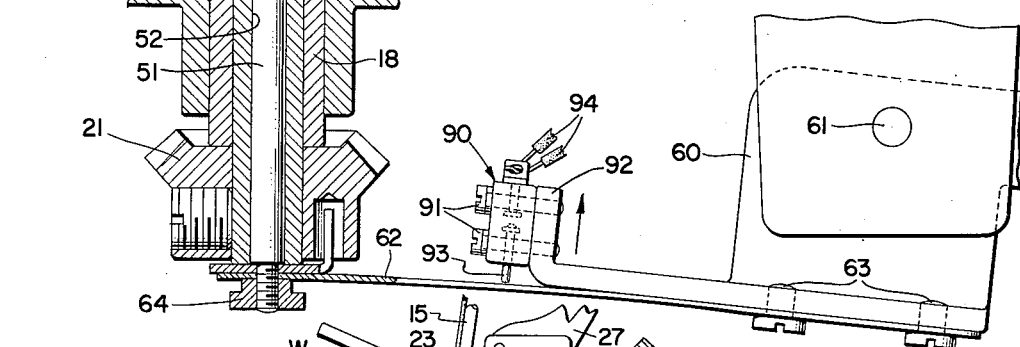
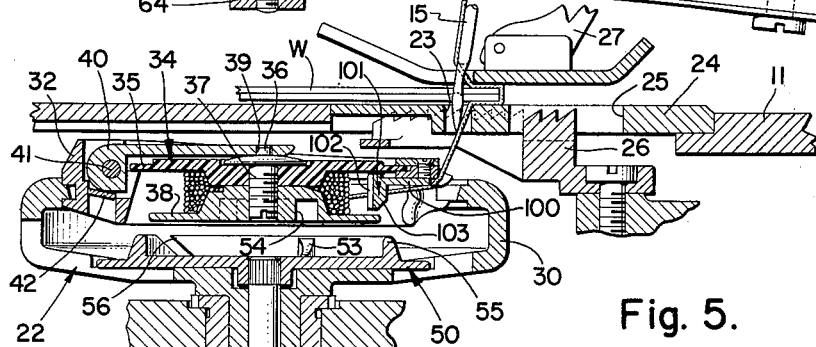
Fig. 5.
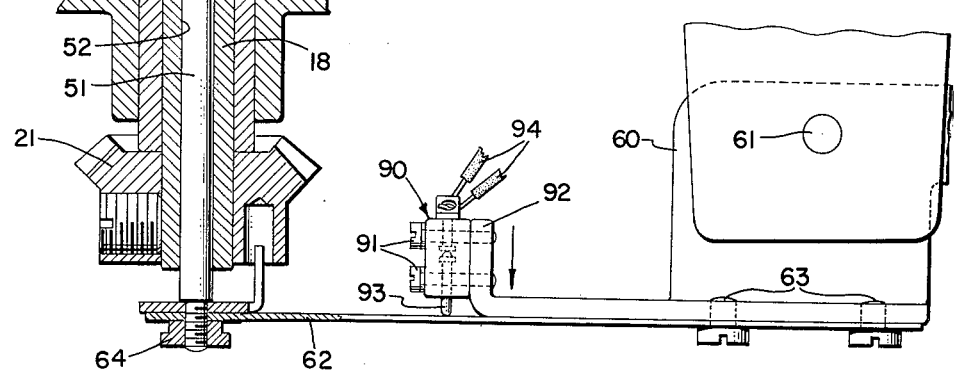

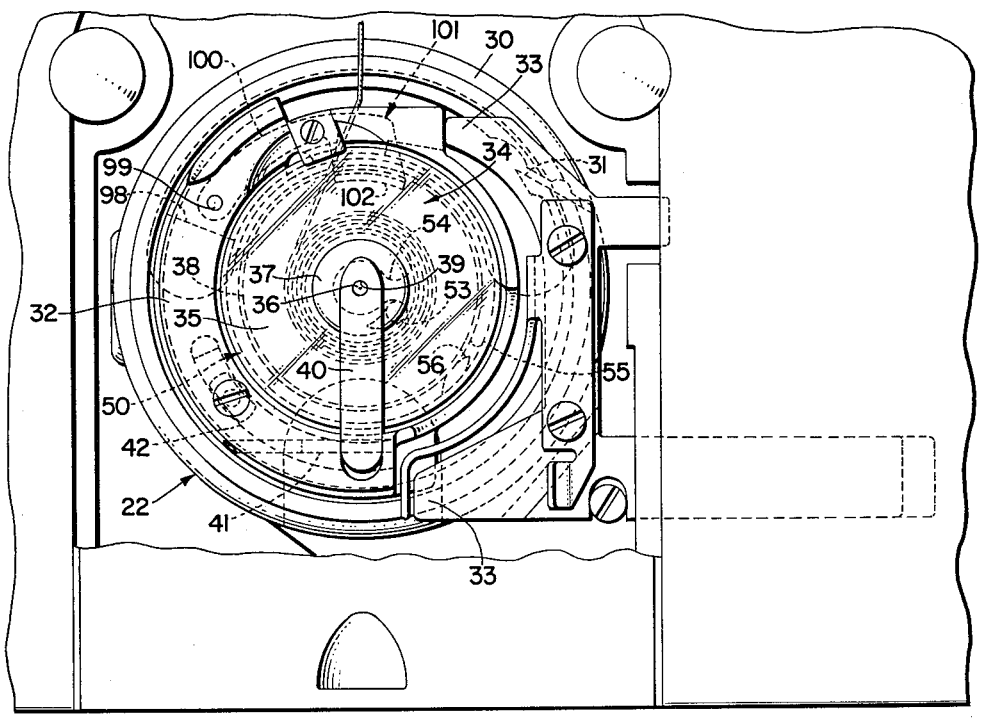
Fig. 6.
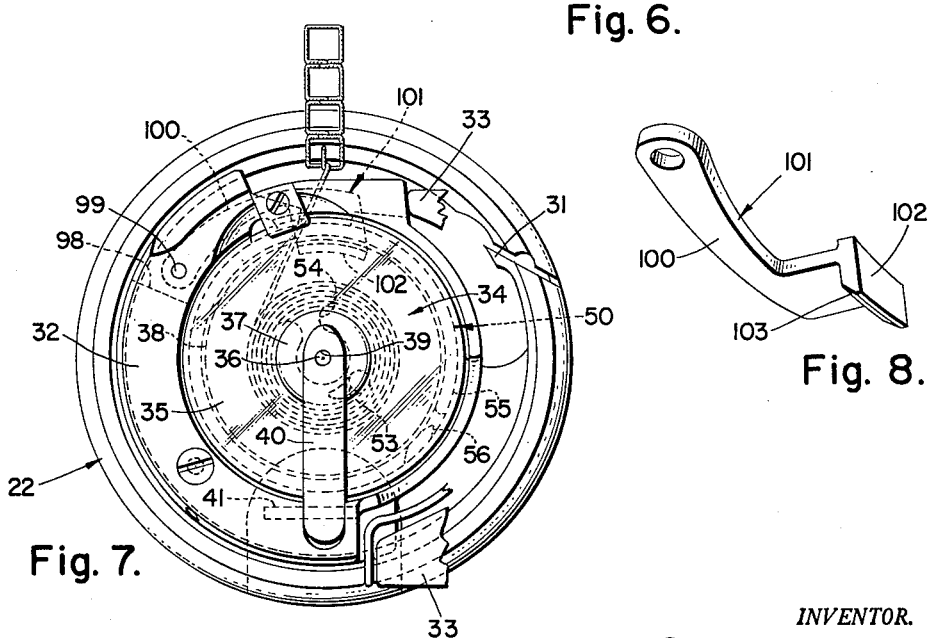
Fig. 7.
Fig. 8.
INVENTOR.
STANLEY J. KETTERER

June 23, 1964      S. J. KETTERER      3,138,127
CONTROL DEVICE FOR THE DRIVE OF A LOCK STITCH SEWING MACHINE
Filed Nov. 3, 1961      5 Sheets-Sheet 5

INVENTOR.
STANLEY J. KETTERER
BY
Marshall J. Breen
ATTORNEY

WITNESS
Nicholas Loszczak

United States Patent Office 3,138,127
Patented June 23, 1964

3,138,127
CONTROL DEVICE FOR THE DRIVE OF A LOCK STITCH SEWING MACHINE
Stanley J. Ketterer, Morris Plains, N.J., assignor to The Singer Company, a corporation of New Jersey
Filed Nov. 3, 1961, Ser. No. 150,078
16 Claims. (Cl. 112—184)

This invention relates to lock stitch sewing machines having mechanism associated therewith for replenishing thread on the bobbin, and this invention is especially useful and advantageous as embodied in a lock stitch sewing machine provided with means for replenishing thread on a bobbin in place in the loop-taker during such interrelated motion of the needle and loop-taker as is required for the formation of lock stitches. More particularly, this invention relates to mechanisms associated with a sewing machine bobbin winding mechanism for automatically interrupting the sewing machine drive.

It is an object of this invention to provide a control device associated with a sewing machine bobbin winding mechanism and effective automatically to interrupt the sewing machine drive upon completion of the replenishment of a preselected amount of thread on the bobbin.

Another object of this invention is to provide a novel control device associated with the bobbin winding mechanism of a lock stitch sewing machine for automatically interrupting the sewing machine drive when the bobbin has become fully replenished with thread so as to prevent overwinding or spilling of thread from the bobbin.

It is an object of this invention, in a lock stitch sewing machine having means which may be rendered effective for replenishing thread on a bobbin in place in the loop-taker during such interrelated motion of the needle and loop-taker as is required for the formation of lock stitches, to provide a novel device which will automatically interrupt the bobbin thread replenishing means when a preselected amount of thread is sensed on the bobbin.

More specifically it is an object of this invention, in a lock stitch sewing machine having mechanism which may be rendered effective for replenishing thread on a bobbin in place in the loop-taker during such interrelated motion of the needle and loop-taker as is required for the formation of lock stitches, to provide a novel control device which will automatically interrupt the sewing machine drive when the bobbin has become fully replenished with thread, and which will maintain the sewing machine drive interrupted until the bobbin thread replenishing mechanism is rendered ineffective.

Further, it is an object of this invention to provide in a sewing machine of the above character, a novel and improved counting mechanism for determining selectively the amount of bobbin thread to be replenished, and a novel control device associated with the counting and bobbin thread replenishing mechanisms which will automatically interrupt the sewing machine drive when the selected amount of bobbin thread has been replenished.

It is also an object of this invention, in a lock stitch sewing machine having mechanism which may be rendered effective for replenishing thread on a bobbin in place in the loop-taker during such interrelated motion of the needle and loop-taker as is required for the formation of lock stitches, to provide a single electrical switch means and a novel arrangement of the single electrical switch means with the bobbin thread replenishing mechanism so as to effect interruption of the power delivered to an electric sewing machine driving motor upon either the bobbin becoming fully wound or a preselected amount of thread being wound thereon whichever event might first occur.

It is a still further object of this invention to provide a means requiring specific operator influence for rendering the bobbin replenishing mechanism ineffective and for simultaneously reestablishing the sewing machine drive.

Figure 9:
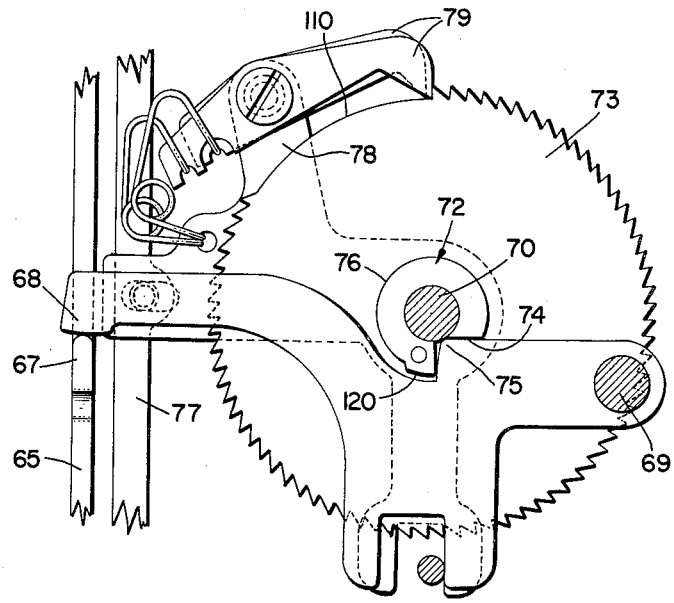
Figure 10:
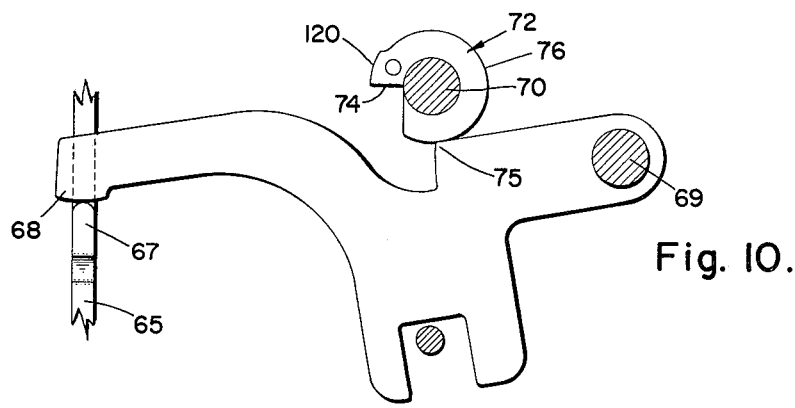
Figure 11:
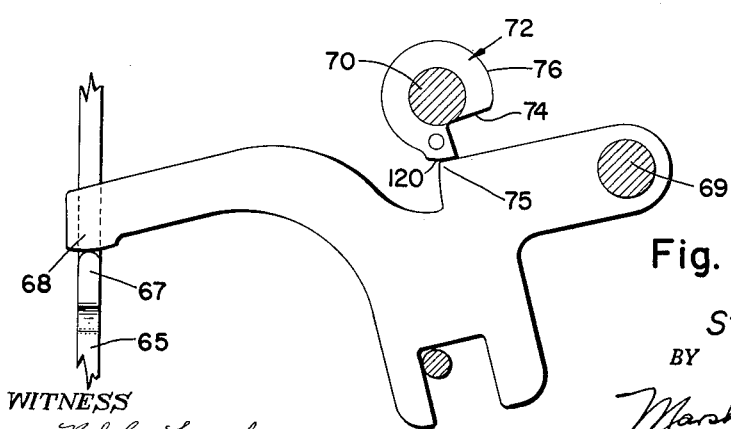

With the above and other objects in view and with the advantages that the bobbin cannot under any circumstances be wound to overflowing and that the sewing machine cannot revert to stitch formation without cognizance of the operator, this invention comprises the devices, combinations and arrangements of parts hereinafter described and illustrated in the accompanying drawings of a preferred embodiment in which:

FIG. 1 represents a side elevational view of a sewing machine having this invention applied thereto, FIGS. 2, 3, 4 and 5 each represent an enlarged vertical cross-sectional view of the loop-taker including fragments of the stitch forming instrumentalities which cooperate with the loop-taker taken substantially along line A—A of FIG. 1, together with an elevational view of a portion of the bobbin replenishing lever and the microswitch carried thereby with the position of the bobbin replenishing lever shifted approximately 90° about the axis of the loop-taker drive shaft more clearly to illustrate the relationship of the parts and in which, FIG. 2 illustrates the position of the parts at the initiation of bobbin replenishment, FIG. 3 illustrates the position of the parts when the bobbin becomes fully wound, FIG. 4 illustrates the position of the parts after an amount of bobbin thread has been wound as predetermined by the counting mechanism and, FIG. 5 illustrates the position of the parts when the bobbin replenishing mechanism has been rendered ineffective by the sewing machine operator and at the initiation of stitch formation, FIG. 6 represents a top plan view of the loop-taker including a thread being replenished on the bobbin therein, FIG. 7 represents a top plan view of the loop taker during stitch formation including a quasi-diagrammatic representation of the stitches being formed, FIG. 8 is a perspective view of the bobbin thread sensing element, FIG. 9 represents an enlarged elevational view of a portion of the counting and control mechanism for bobbin replenishment which is carried in the sewing machine standard and with the parts in the positions occupied during sewing, FIG. 10 represents an elevational view of the operating lever of the counting and control mechanism of FIG. 8 in the position occupied during replenishment of an amount of thread as determined by the counting mechanism, FIG. 11 represents an elevational view of the operating lever of FIG. 9 in the position occupied during interruption of the sewing machine drive at the completion of replenishment on the bobbin of that amount of thread determined by the counting mechanism, and FIG. 12 is a circuit diagram illustrating the electrical connection of the switch means of this invention with the sewing machine drive motor.

The sewing machine illustrated in the drawings, including the stitch forming instrumentalities and the provisions therein whereby a bobbin thread may be replenished on a bobbin in place in the loop-taker during such interrelated movements of the needle and loop-taker as are required for the formation of lock stitches are similar to that disclosed in my copending United States patent application No. 133,986, filed August 25, 1961. The control mechanism for initiating bobbin replenishment, determining selectively the amount of thread to be replenished on the bobbin, and terminating the operation of the bobbin replenishing operation is similar to that disclosed in my copending United States patent application No. 133,911, filed August 25, 1961, now Patent No. 3,103,189.

The following general description of the stitch forming instrumentalities and of the mechanism for controlling the replenishment of bobbin thread will be sufficient to those skilled in the sewing art for an understanding of the detailed description of this invention contained hereinbelow.

The sewing machine frame comprises a bed 11, a standard 12 rising from the bed, and a bracket arm 13 extending over the bed. A main shaft 14 journaled in the bracket arm is operatively connected to impart endwise reciprocatory movement to a thread carrying needle 15. The main shaft 14 is also operatively connected by means of a standard shaft 16, a bed shaft 17, a loop-taker shaft 18 and meshing gears 19, 20, and 21, therebetween, to impart rotary motion to a loop-taker 22 secured on the loop-taker shaft in timed relation with the needle reciprocation and preferably at the rate of two loop-taker revolutions for each needle reciprocation.

The needle passes endwise through a needle aperture 23 in a throat plate 24 carried on the sewing machine bed. The throat plate is also slotted as at 25 to accommodate a work feeding dog 26 which is preferably driven in a conventional fashion from the actuating mechanism for the needle and loop-taker, that is, from the main shaft 14 or the standard or bed shafts connected thereto, so as to cooperate with the needle and loop-taker in forming lock stitches in a work fabric W constrained on the throat plate by a presser foot 27 spring biased downwardly from the bracket arm.

The loop-taker 22 includes a cup-shaped body portion 30 formed with a loop seizing beak 31, in which body portion is journaled a bobbin case 32 which is restrained against rotation by a bifurcated rotation restraining member 33 carried in the bed. A bobbin 34 is ordinarily free to turn in the bobbin case, being supported therein by a top flange 35 which rests on the bobbin case and being centered therein by a pin 36 formed atop the crowned head of a fastening screw 37 securing to the top flange a bottom flange 38. The pin 36 is accommodated in a clearance aperture 39 formed in an arm 40 pivoted on a pin 41 in the bobbin case and biased downwardly by a spring 42. The spring 42 thus provides a frictional force between the bobbin and the bobbin case resisting turning of the bobbin and providing a tension on the bobbin thread during sewing operations.

The mechanism above described is capable of introducing to the bobbin a loop of the thread carried by the needle and of winding the thread on the bobbin to replenish the under or locking thread supply during continued interrelated movement of the needle and loop-taker as is required for the formation of lock stitches. Instrumental in bobbin thread replenishment is a bobbin winding member 50 carried within the loop-taker body portion beneath the bobbin on a rod 51 slidable in an axial bore 52 in the loop-taker shaft 18. The bobbin winding member includes a pin 53 engageable in an arcuate slot 54 in the bobbin to drive the bobbin when the bobbin winding member is raised. The bobbin winding member is also formed with an annular rib 55 slightly larger in diameter than the lower flange of the bobbin, which rib embraces the lower bobbin flange when the bobbin winding member is raised, and in addition, the rib 55 is formed with a thread engaging beak 56.

The stitch forming mechanism thus far described is identical with that described in greater detail in my above referred application No. 133,896 and it will be noted that as thus far described, the rib 55 of the bobbin winding member serves two purposes, first the rib deflects the needle thread loop into the bobbin upon initiation of bobbin thread replenishment, and second the beak 56 thereof serves to engage, snub one limb of the deflected thread loop about the bobbin, and thereafter to sever the limb of the thread loop. In the present invention, as will be described hereinbelow, the rib 55 serves a third novel function having to do with preventing overwinding or spilling of thread from the bobbin during replenishment thereof.

The vertical position of the bobbin winding member 50, and thus initiation and completion of bobbin replenishment, is controlled by a thread replenishing lever 60 fulcrumed at 61 in the sewing machine bed. The lever 60 is connected to the rod 51 by means of a stout leaf spring 62 secured to the lever by fastening screws 63 and secured to the rod 51 by means of a nut 64. A link 65 pivotally connected to the lever 60 extends vertically through the standard to a needle thread tension releasing lever 66 which does not form a direct part of this invention. The link 65, however, is formed with a lug 67 which is engaged by a lever arm 68 fulcrumed at 69 in a control mechanism carried in the sewing machine standard. The control mechanism includes a shaft 70 journaled in the standard having an operator influenced dial 71 secured thereto outside the sewing machine standard and a cam 72 and a ratchet wheel 73 secured thereto inside the machine standard. The cam 72 is formed with a notch 74 which accommodates a follower shoulder 75 formed on the lever arm 68. When the shoulder 75 is seated in the cam notch 74, as illustrated in FIG. 9, the lever arm 68 by way of the lug 67 releases the link 65 and the thread replenishing lever 60 pivoted thereto for return to a position as illustrated in FIGS. 1 and 5 in which the bobbin winding member 50 is lowered and the machine is in readiness for sewing. When the dial 71 is turned so as to shift the cam notch away from the shoulder 75, the lever arm 68 will be depressed as illustrated in FIG. 10, by a concentric portion 76 of the cam 72 thus depressing the link 65 and raising the bobbin winding member 50 into effective position as illustrated in FIG. 2. Depression of the link 65 also serves to establish a driving connection between an operative member of the sewing machine, as for instance, a feed drive pitman 77 illustrated in FIG. 9 and a pivoted pawl carrier 78 carrying one or more pawls 79 biased against the periphery of the ratchet wheel 73 which ratchet and pawl device serves to index the control mechanism in step-by-step fashion into the position illustrated in FIG. 9 in which sewing will occur.

The control mechanism thus far described is identical with that described in greater detail in my above referenced application No. 1,33,911, to which reference may be had.

Referring now to the present invention, a microswitch 90 is employed being secured as by screws 91 to an ear 92 upturned from the substantially rigid portion of the thread replenishing lever 60. The microswitch is of the normally open held closed variety and includes a plunger 93 disposed in engagement with the leaf spring 62. When the spring 62 is relaxed or substantially relaxed as when called upon merely to overcome the weight of the bobbin winding member 50 and the rod 51, the plunger 93 of the microswitch will be depressed by the spring and the microswitch held closed thereby.

The microswitch is connected as by leads 94 to the supply circuit for an electric sewing machine driving motor 95 preferably disposed in the standard at the juncture with the bed and connected as by the drive 96 to the sewing machine main shaft 14. The electric motor may be controlled by the operator as by a knee or foot controlled rheostat (not shown) and the microswitch 90 is preferably included in the circuitry for the electric motor so as to pre-empt all other controls and interrupt the electric motor drive when the microswitch is permitted to open.

The cam portion 76 of the cam 72 is preferably so proportioned with respect to the linkage 60, 62, 65, 67 and 68, which connects the cam 72 with the bobbin winding member 50, that when the cam portion 76 engages the shoulder 75 of the lever arm 68, as illustrated in FIG. 10, the bobbin winding member will be shifted upwardly into a position, as illustrated in FIG. 2, slightly beneath the extreme upper position to which it is capable of moving. In the normal position of parts for replenishment of the bobbin thread, therefore, the spring 62 will be called upon merely to lift the bobbin winding member 50 and the rod 51 to which it is secured, and the force thus opposing the spring 62 will be ineffective to cause noticeable flexing of the spring and consequently, the microswitch 90 will remain held closed permitting conventional operation of the sewing machine drive motor.

Disposed in a slot 98 formed in the bobbin case 32 and pivoted therein by a pin 99 is an arm 100 of a bobbin thread sensing member 101. The inturned free extremity of the arm 100 is formed with a vertically enlarged, slightly concave thread engaging shoe 102 which is arranged as illustrated in FIGS. 2 to 7 projecting inwardly from the bobbin case and disposed between the flanges 35–38 of the bobbin. Extending from the bottom edge of the thread engaging shoe 102 toward the arm 100, the thread sensing member is formed with an upwardly inclined cam surface 103.

When less than a full complement of thread is wound on the bobbin as illustrated in FIGS. 2, 4 and 5, the cam surface 103 of the thread sensing member is disposed inwardly of the rim 55 of the bobbin winding member 50. As thread wound on the bobbin increases inside the shoe 102 and forces the shoe outwardly, however, the cam surface 103 engages the rim 55 and, as illustrated in FIG. 3, forces the bobbin winding member 50 and the attached rod 51 downwardly. Bearing in mind that the cam surface 76 of the cam 72 in the control mechanism, as illustrated in FIG. 10, restrains the thread replenishing lever 60, the downward movement of the rod 51 in response to the cam surface 103 stresses and flexes the spring 62 so as to release the plunger 93 and open the microswitch 90 thus interrupting the sewing machine drive and preventing further bobbin winding.

To facilitate the replenishment of a full bobbin of locking thread, the ratchet wheel 73 of the control mechanism in the machine standard is formed with a smooth section 110 having no ratchet teeth. The section 110 extends over that angular interval about the periphery of the ratchet wheel over which the pawls 79 play when the dial is turned to shift the cam notch 74 out of engagement with the cam follower shoulder 75. With this arrangement, when the dial 71 is turned so as to initiate bobbin replenishment but not appreciably farther, the pawls 79 although they become actuated, play over the smooth section 110 and thus do not index the control device. The machine thus continues to wind the bobbin until the thread sensing member 101 operates to open the microswitch 90 and interrupt the sewing machine drive. The operator then need only return the dial to the sewing position illustrated in FIGS. 1 and 9 to render the machine in readiness for sewing.

Should the operator desire to replenish the bobbin with less than its full capacity, she may do so by turning the dial 71 of the control mechanism beyond that required to initiate bobbin replenishment or until the pawls 79 engage the ratchet teeth beyond the smooth section 110. The pawls will then index the control unit toward the sewing position illustrated in FIGS. 1 and 9, winding on the bobbin a selected amount of thread inversely proportional to the amount that the operator manually advances the dial toward the sewing position.

In order that the sewing machine, after completion of winding the bobbin to less than maximum capacity under the influence of the control mechanism, will not revert to stitch formation unexpectedly to the operator, the cam 72 adjacent to the cam notch 74 in the direction which the cam 72 is turned by the ratchet 73 and pawls 79 is formed with a small raised cam lobe 120.

As the control mechanism is indexed toward the sewing position illustrated in FIGS. 1 and 9, and as the sewing position is approached, the cam lobe 120 engages the follower shoulder 75 of the lever arm 68, as illustrated in FIG. 11, causing the thread replenishing lever 60 to be turned into a position as illustrated in FIG. 4 beyond that which may be accommodated by the extreme upper position to which the rod 51 and the bobbin winding member may be moved. Such motion of the lever 60, therefore, stresses and flexes the spring 62 so as to release the plunger 93 and open the microswitch 90 thus interrupting the sewing machine drive and preventing unexpected reversion to sewing.

When the microswitch 90 is opened either by the occasion of the bobbin becoming fully wound or of the impending completion of indexing of the control mechanism, the operator need merely turn the control dial 71 to the sewing position as illustrated in FIG. 1 to reestablish the electrical connections to the motor and to set the machine in readiness for sewing.

It will thus be appreciated that with the present invention the bobbin cannot under any circumstances be wound to overflowing nor can the sewing machine revert to stitch formation without cognizance of the operator.

Having set forth the nature of this invention, what I claim herein is:

1. A lock stitch sewing machine having stitch forming instrumentalities including a needle and a loop-taker, a bobbin journaled in said loop-taker, actuating means interconnecting said needle and loop-taker for interrelated movement as is required for the formation of lock stitches, an electric motor connected to drive said actuating means, means for replenishing thread on said bobbin in place in said loop-taker during said interrelated motion of said needle and loop-taker, means for sensing a predetermined quantity of thread wound on said bobbin, electric switch means responsive to operation of said bobbin thread sensing means, and means connecting said switch means electrically with said electric motor to deenergize said motor for interrupting said drive for said actuating mechanism.

2. A lock stitch sewing machine having stitch forming instrumentalities including a needle and a loop-taker, a bobbin journaled in said loop-taker, actuating means interconnecting said needle and loop-taker for interrelated movement as is required for the formation of lock stitches, an electric motor connected to drive said actuating means, means for replenishing thread on said bobbin in place in said loop-taker during said interrelated motion of said needle and loop-taker, control mechanism for maintaining said bobbin replenishing means effective during a selected period of said interrelated needle and loop-taker motion, means for sensing completion of said selected period of interrelated motion of said needle and loop-taker motion, electric switch means responsive to operation of said sensing means and means connecting said switch means electrically with said electric motor to deenergize said motor for interrupting said drive for said actuating mechanism.

3. A lock stitch sewing machine having stitch forming instrumentalities including a needle and a loop-taker, a bobbin journaled in said loop-taker, actuating means interconnecting said needle and loop-taker for interrelated movement as is required for the formation of lock stitches, means for driving said actuating means, means for replenishing thread on said bobbin in place in said loop-taker during said interrelated motion of said needle and loop-taker, means for sensing thread wound to substantially the full capacity on said bobbin, control mechanism for maintaining said bobbin replenishing means effective during a selected period of said interrelated needle and loop-taker motion, means for sensing completion of said selected period of interrelated motion of said needle and loop-taker motion, interrupting means for said bobbin thread replenishing means, and means responsive to either the operation of said means for sensing thread wound to substantially the full capacity of said bobbin or to the operation of said means for sensing completion of said selected period of interrelated motion of said needle and loop-taker for operating said interrupting means.

4. A lock stitch sewing machine having stitch forming instrumentalities including a needle and a loop-taker, a bobbin journaled in said loop-taker, actuating means interconnecting said needle and loop-taker for interrelated movement as is required for the formation of lock stitches, means for driving said actuating means, means for replenishing thread on said bobbin in place in said loop-taker during said interrelated motion of said needle and loop-taker, means for sensing thread wound to substantially the full capacity on said bobbin, control mechanism for maintaining said bobbin replenishing means effective during a selected period of said interrelated needle and loop-taker motion, means for sensing completion of said selected period of interrelated motion of said needle and loop-taker motion, and a single means responsive both to the operation of said means for sensing thread wound to substantially the full capacity on said bobbin and to the operation of said means for sensing completion of said selected period of interrelated motion of said needle and loop-taker for interrupting said means for driving said actuating means.

5. A lock stitch sewing machine having stitch forming instrumentalities including a needle and a loop-taker, a bobbin journaled in said loop-taker, actuating means interconnecting said needle and loop-taker for interrelated movement as is required for the formation of lock stitches, an electric motor connected to drive said actuating means, means for replenishing thread on said bobbin in place in said loop-taker during said interrelated motion of said needle and loop-taker, means for sensing thread wound to substantially the full capacity on said bobbin control mechanism for maintaining said bobbin replenishing means effective during a selected period of said interrelated needle and loop-taker motion, means for sensing completion of said selected period of interrelated motion of said needle and loop-taker motion, and a single electric switch means responsive both to the operation of said means for sensing thread wound to substantially the full capacity in said bobbin and to the operation of said means for sensing completion of said selected period of interrelated motion of said needle and loop-taker and means connecting said electric switch means electrically with said electric motor for interrupting said drive for said actuating mechanism.

6. In a lock-stitch sewing machine having a circularly movable loop-taker, means for driving said loop-taker, a bobbin case journaled in said loop-taker and restrained from circular movement therewith, and a bobbin having axially spaced flanges journaled in said bobbin case, a thread sensing member shiftably supported on said bobbin case, a thread engaging shoe formed on said thread sensing member and disposed between said bobbin flanges, and means engageable with said thread sensing member and responsive to movement of said thread engaging shoe into a predetermined position for interrupting said means for driving said loop-taker.

7. In a lock stitch sewing machine having a circularly movable loop-taker, means for driving said loop-taker, a bobbin case journaled in said loop-taker and restrained from circular movement therewith, and a bobbin having axially spaced flanges journaled in said bobbin case, means for replenishing thread on said bobbin in place in said loop-taker during circular movement of said loop-taker, a thread sensing member shiftably supported on said bobbin case, a thread engaging shoe formed on said thread sensing member shiftably supported on said bobbin case, a thread engaging shoe formed on said thread sensing member and disposed between said bobbin flanges, and means engageable with said thread sensing member and responsive to movement of said thread engaging shoe under the influence of thread wound on said bobbin outwardly into a position adjacent to the periphery of said bobbin flanges for interrupting said means for driving said loop-taker to prevent overwinding of thread on said bobbin.

8. In a lock-stitch sewing machine having a circularly movable loop-taker, an electric motor operatively connected to drive said loop-taker, a bobbin case journaled in said loop-taker and restrained from circular movement therewith, and a bobbin having axially spaced flanges journaled in said bobbin case, a thread sensing member shiftably supported on said bobbin case, a thread engaging shoe formed on said thread sensing member and disposed between said bobbin flanges, an electric switch carried on said sewing machine, switch actuating means engageable with said thread sensing member and responsive to movement of said thread sensing shoe into a predetermined position under the influence of thread wound on said bobbin, and means electrically connecting said electric switch with said electric motor for interrupting operation of said electric motor upon actuation of said electric switch.

9. A lock stitch sewing machine having stitch forming instrumentalities including a needle and a circularly moving loop-taker, a bobbin journaled in said loop-taker, actuating means interconnecting said needle and loop-taker for interrelated movement as is required for the formation of lock stitches, means for driving said actuating means, means for replenishing thread on said bobbin in place in said loop-taker during said interrelated motion of said needle and loop-taker including a bobbin winding member disposed between said bobbin and said loop-taker, means shiftably supporting said bobbin winding member axially of said loop-taker into and out of operative bobbin winding position toward said bobbin, and an operator-influenced control member operatively connected to said bobbin winding member and supported on said sewing machine for movement into and out of a position urging said bobbin winding member into operative bobbin winding position, means for sensing the quantity of thread wound on said bobbin, cam means associated with said bobbin thread sensing means engageable with said bobbin winding member in the operative bobbin winding position of said bobbin winding member and upon the sensing of a predetermined quantity of thread wound on said bobbin for urging said bobbin winding member in a direction out of operative bobbin winding position, strain responsive means disposed between said cam means and said control member, and means operated by said strain responsive means when said cam means and said control member urge said bobbin winding member in opposite directions for interrupting said means for driving said actuating means.

10. A lock stitch sewing machine having stitch forming instrumentalities including a needle and a circularly moving loop-taker, a bobbin having axially spaced flanges journaled in said loop-taker, actuating means interconnecting said needle and loop-taker for interrelated movement as is required for the formation of lock stitches, means for driving said actuating means, means for replenishing thread on said bobbin in place on said loop-taker during said interrelated motion of said needle and loop-taker including a bobbin winding member disposed between said bobbin and said loop-taker, a raised rim formed on said bobbin winding member larger in diameter than the adjacent bobbin flange, means shiftably supporting said bobbin winding member axially of said loop-taker into and out of operative bobbin winding position toward said bobbin and with said rim embracing said adjacent bobbin flange, and an operator-influenced control member operatively connected to said bobbin winding member and supported on said sewing machine for movement into and out of a position urging said bobbin winding member into operative bobbin winding position, bobbin thread sensing means including a probe shiftably supported in said loop-taker for movement radially of said bobbin, a thread engaging shoe carried on said probe between said bobbin flanges, and cam means associated with said bobbin thread sensing means engageable with said bobbin winding member in the operative bobbin winding position of said bobbin winding member and upon the sensing of a predetermined quantity of thread wound on said bobbin for urging said bobbin winding member in a direction out of operative bobbin winding position, strain responsive means disposed between said cam means and said control member, and means operated by said strain responsive means when said cam means and said control member urge said bobbin winding member in opposite directions for interrupting said means for driving said actuating means.

11. A lock stitch sewing machine having stitch forming instrumentalities including a needle and a circularly moving loop-taker, a bobbin journaled in said loop-taker, actuating means interconnecting said needle and loop-taker for interrelated movement as is required for the formation of lock stitches, an electric motor connected to drive said actuating means, means for replenishing thread on said bobbin in place in said loop-taker during said interrelated motion of said needle and loop-taker including a bobbin winding member disposed between said bobbin and said loop-taker, means shiftably supporting said bobbin winding member axially of said loop-taker into and out of operative bobbin winding position toward said bobbin, control means including a rigid operator-influenced lever fulcrumed in said sewing machine, a spring means operatively connected to said lever and to said bobbin winding member for urging said bobbin winding member into operative bobbin winding position, means for sensing the quantity of thread wound on said bobbin, cam means associated with said bobbin thread sensing means engageable with said bobbin winding member in the operative bobbin winding position of said bobbin winding member and upon the sensing of a predetermined quantity of thread wound on said bobbin for urging said bobbin winding member in a direction out of operative bobbin winding position, an electric switch means operatively arranged between said rigid operator influenced lever and said spring means and responsive to strain induced in said spring means when said cam means and said operator influenced lever urge said bobbin winding member in opposite directions, and means connecting said electric switch means electrically with said electric motor for interrupting said drive for said actuating mechanism upon the sensing of said predetermined quantity of thread wound on said bobbin.

12. A lock-stitch sewing machine having stitch forming instrumentalities including a needle and a circularly moving loop-taker, a bobbin journaled in said loop-taker, actuating means interconnecting said needle and loop-taker for interrelated movement as is required for the formation of lock stitches, means for driving said actuating means, means for replenishing thread on said bobbin in place in said loop-taker during said interrelated motion of said needle and loop-taker including a bobbin winding member disposed between said bobbin and said loop-taker, means shiftably supporting said bobbin winding member axially of said loop-taker into and out of operative bobbin winding position toward said bobbin, means for limiting the axial motion of said bobbin winding member toward said bobbin, and a control means for said bobbin thread replenishing means including a cam means carried by said sewing machine, a lever fulcrumed in said sewing machine and operatively connecting said cam means with said bobbin winding member, said cam means including a first cam station arranged to position said bobbin winding member out of operative bobbin winding position, a second cam station arranged to position said bobbin winding member into operative bobbin winding position, and a third cam station arranged to urge said bobbin winding member toward said bobbin beyond a position thereof constrained by said limiting means, strain responsive means disposed between said bobbin winding member and said cam means, and means operated by said strain responsive means for interrupting said means for driving said actuating means.

13. A sewing machine as set forth in claim 12 in which said cam means comprises a cam disk journaled in said sewing machine, operator influenced means for at will turning said cam disk, and means driven by said sewing machine actuating mechanism for indexing said cam disk from a position of effectiveness of said second cam station to a position of effectiveness of said third cam station.

14. A sewing machine as set forth in claim 12 in which said means for driving said sewing machine actuating means comprises an electric motor and in which said strain responsive means comprises a spring means connecting said lever with said bobbin winding member and an electric switch carried by said lever and disposed for operation in response to strain in said spring means, and in which said means for interrupting said means for driving said actuating means comprises means connecting said electric switch means electrically with said electric motor.

15. A lock-stitch sewing machine having stitch forming instrumentalities including a needle and a circularly moving loop-taker, a bobbin journaled in said loop-taker, actuating means interconnecting said needle and loop-taker for interrelated movement as is required for the formation of stitches, an electric motor operatively connected to drive said actuating means, means for replenishing thread on said bobbin in place in said loop-taker during said interrelated motion of said needle and loop-taker including a bobbin winding member disposed between said bobbin and said loop-taker, means shiftably supporting said bobbin winding member for movement axially of said loop-taker into and out of operative bobbin winding position toward said bobbin, means limiting the axial motion of said bobbin winding member toward said bobbin, and a control means for said bobbin thread replenishing means including a first cam means carried by said sewing machine, a lever fulcrumed in said sewing machine and operatively connecting said first cam means with said bobbin winding member, said first cam means including a first cam station arranged to position said bobbin winding member out of operative bobbin winding position, a second cam station arranged to position said bobbin winding member into operative bobbin winding position, and a third cam station arranged to urge said bobbin winding member toward said bobbin beyond a position thereof constrained by said limiting means, means for sensing the quantity of thread wound on said bobbin, second cam means associated with said bobbin thread sensing means engageable with said bobbin winding member in the operative bobbin winding position of said bobbin winding member and upon the sensing of a predetermined quantity of thread wound on said bobbin for urging said bobbin winding member in a direction out of operative bobbin winding position, strain responsive means between said bobbin winding member and said lever comprising a spring means connecting said lever with said bobbin winding member, and an electric switch carried by said lever and disposed for operation in response to strain in said spring means, and means connecting said switch means electrically with said electric motor for interrupting said drive for said sewing machine actuating mechanism in response to strain in said spring means.

16. A sewing machine as set forth in claim 15 in which said first cam means comprises a cam disk journaled in the sewing machine, operator influenced means for at will turning said cam disk, a ratchet wheel secured for turning with said cam disk, pawl means associated with said ratchet wheel, means for rendering said sewing machine actuating mechanism effective to operate said pawl means upon operator influenced turning of said first cam means out of a position of effectiveness of said first cam station, said ratchet wheel being formed with a segment ineffective for cooperation with said pawl means, said ineffective ratchet wheel section being disposed relatively to said pawl means in a position corresponding to the position of effectiveness of said first cam station and a portion of said second cam station immediately adjacent to said first cam station.

References Cited in the file of this patent

UNITED STATES PATENTS

| | | |
|---|---|---|
| 1,794,255 | Stephenson | Feb. 24, 1931 |
| 2,255,152 | Colegrove | Sept. 9, 1941 |
| 2,526,279 | Roseman | Oct. 17, 1950 |
| 2,840,022 | Hamlett | June 24, 1958 |

FOREIGN PATENTS

| | | |
|---|---|---|
| 1,224,744 | France | Feb. 8, 1960 |